350-96.25 SR
2/27/79 XR 4,141,641

United States Patent [19]

Nagai et al.

[11] 4,141,641

[45] Feb. 27, 1979

[54] OPTICAL FIBER CATHODE RAY TUBES AND COPY MACHINES USING THE SAME

[75] Inventors: Kiyoshi Nagai; Hitoshi Ikeda; Takayuki Handa, all of Mitaka, Japan

[73] Assignee: Japan Radio Company, Ltd., Tokyo, Japan

[21] Appl. No.: 812,070

[22] Filed: Jul. 1, 1977

[30] Foreign Application Priority Data

Jul. 7, 1976 [JP] Japan .................................. 51-80484

[51] Int. Cl.$^2$ .............................................. G03B 27/00

[52] U.S. Cl. ..................................... 355/1; 350/96.25; 355/20; 358/302; 358/901

[58] Field of Search ......................... 355/1, 20; 354/6; 346/110 R, 74 CR; 358/302, 901; 350/96 B, 175 GN

[56] References Cited

U.S. PATENT DOCUMENTS 3,658,407 4/1972 Kitano et al. ...................... 350/96.25

FOREIGN PATENT DOCUMENTS 2025787 11/1970 France.

*Primary Examiner*—Richard A. Wintercorn
*Attorney, Agent, or Firm*—Flynn & Frishauf

[57] ABSTRACT

An improved optical fiber cathode ray tube is provided which enables the recording of images on a recording medium with a high resolution even if the recording medium is disposed with an increased gap between the tube and the recording medium to prevent the mechanical contact therebetween. The tube is provided with a light transparent thin layer between the non-lens-like optical fiber face plate and the phosphor layer. The light transparent thin layer is a transparent plate and may include a spatial gap.

13 Claims, 11 Drawing Figures

OPTICAL FIBER CATHODE RAY TUBES AND COPY MACHINES USING THE SAME

BACKGROUND OF THE INVENTION

This invention relates to copy or recording machines as used in the fields of facsimile, electronic computer terminals, various kinds of control systems, and medical equipments, and, in particular, to fiber-optic, or optical fiber, cathode ray tubes used in such copy machines.

A known copy machine comprises, as schematically shown in FIG. 1, a flying spot tube 1, an optical system including a spherical lens 3 and a photosensitive medium 4. The image 2 displayed on the face plate of the flying spot tube 1 is recorded on the photosensitive medium 4 through the optical system to provide a hard copy.

But this system has disadvantages that the brightness of the image is remarkably reduced by the use of the optical system, that a high-resolution of the flying spot tube is required for a clear record, that a lengthy optical path is required to the optical system and that the optical system is weak to mechanical vibration.

Another known copy machine is one using an optical fiber cathode ray tube (CRT).

The optical fiber CRT 6 is, as shown in FIGS. 2(*a*)-2(*c*), a type of cathode ray tube having an electron gun 61 and a face plate 62. The optical fiber CRT 6 is characterized in that the face plate 62 is a stack of glass fibers. The stack consists of a large number of parallel glass fibers of small diameter each of which is sheathed with a glass having a lower refractive index than that of the fiber glass. The fiber ends from the inner and the outer surfaces of the face plate. The phosphor is deposited on the inner surface of the face plate.

Referring to FIG. 3 in which the construction of the optical fiber CRT is schematically shown, an electron beam 7 is emitted from the electron gun 61 and the phosphor 8 is thereby bombarded and excited to illuminate. The luminous light is emitted from the fibers 9 of the optical fiber face plate 62. The spreading of the emitted light beam 10 depends on the distance from the face plate and the numerical aperture of the face plate.

At the outer surface of the face plate 61, an increased brightness of about 100 times in comparison with the use of the optical system as shown in FIG. 1 and a high resolution are obtained, but they become reduced at a distance from the outer surface of the face plate.

Accordingly, in the known copy machine using an optical fiber CRT, the photosensitive medium 11 must be disposed not apart from the face plate 62 as shown in FIG. 3 but also in direct contact with the face plate as shown in FIG. 4.

Referring to FIG. 4, an electrographic paper 12 as a photosensitive medium is pressed onto the face plate 62 of the optical fiber CRT 6 by a pressure roll 13.

On the other hand, not only electrographic papers such as electrofaxes and dry graphic papers such as dry silver photographic papers but also CdS coated drums and Se (selenium) coated drums are used as a photosensitive medium. In copy machines using plain paper, a CdS or Se coated drum is used for a photosensitive medium. The CdS coating and the Se coating are very weak and are readily injured by friction and mechanical engagement with an object.

Therefore, the optical fiber CRT has not been used in copy machines using a CdS or Se coated drum as a photosensitive medium.

SUMMARY OF THE INVENTION

An object of this invention is to provide a CRT which enables the recording of images on a photosensitive medium with a high resolution and a high brightness, the medium being disposed with a gap from the CRT.

Another object of this invention is to provide an improved optical fiber CRT for achieving the above object with a simple construction.

Still another object is to provide a copy machine wherein freedom is afforded to a relative arrangement between the CRT and the photosensitive medium, whereby the photosensitive medium is disposed out of contact with the CRT.

According to an aspect of this invention, an improved optical fiber CRT is characterized in that a light transparent thin layer is interposed between the optical fiber face plate and the phosphor layer. The transparent layer may include not only a light transparent plate but also spatial gaps. As materials of the plate, glass, ceramics and heat-resistant organic resins such as polyamide and polyimide may be selectively used.

The thickness of the transparent layer may be selected between about 0.03–1mm.

The spreading of the light beam emitted from the improved optical fiber CRT of the present invention is reduced in comparison with the conventional optical fiber CRT. Therefore the improved tubes enable a gap to be maintained between a light emitting end surface and a recording or photosensitive medium without deterioration of image resolution. Accordingly, a copy machine is provided by this invention wherein the photosensitive medium is disposed out of contact with the optical fiber CRT.

DETAILED DESCRIPTION OF PREFERRED EMBODIMENTS

Figure 1:
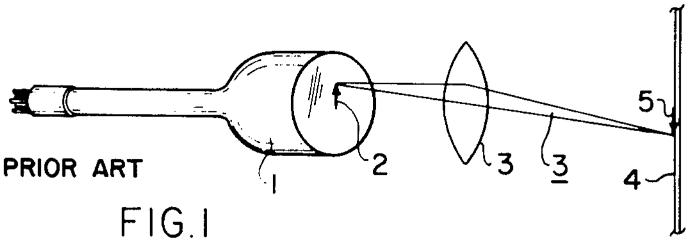
FIG. 1 schematically shows a diagrammatical view of a known copy machine.
Figure 2A:
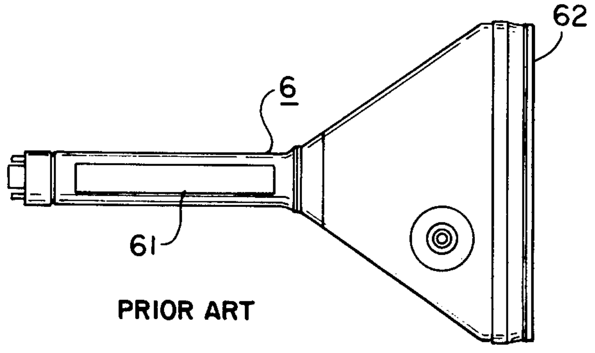
FIGS. 2(*a*)-2(*c*) show different views of a known optical fiber CRT.
Figure 2B:
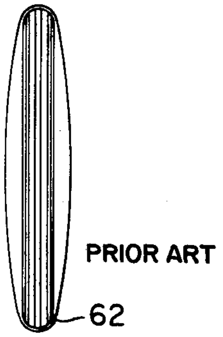
Figure 2C:
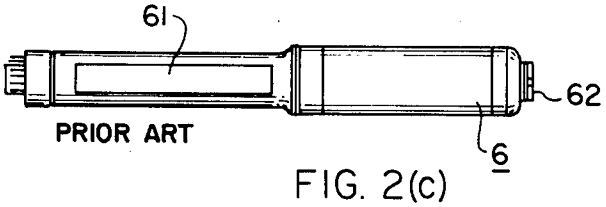
Figure 3:
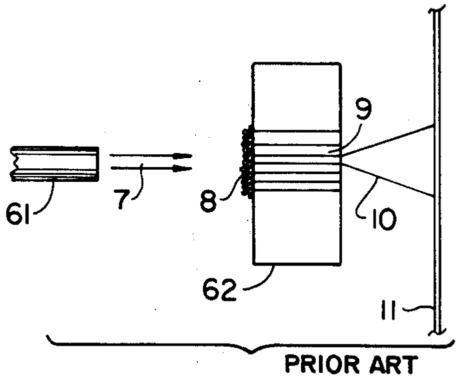
FIG. 3 schematically shows a diagrammatical view of the known optical fiber CRT.
Figure 5:
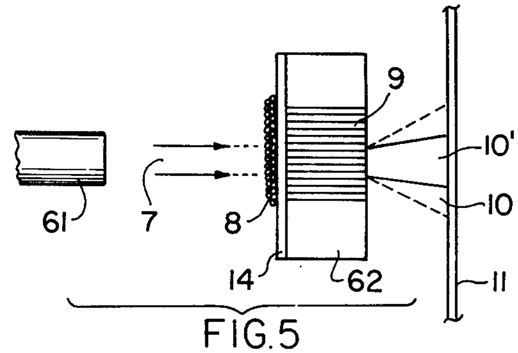
Figure 4:
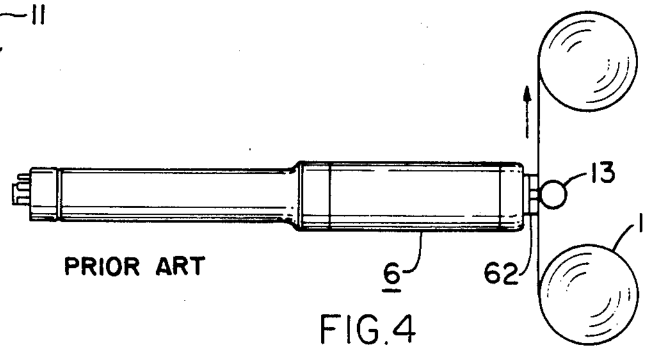
FIG. 4 shows a side view of a known copy machine using the conventional optical fiber CRT, which is simplified for illustrating only the relative arrangement between the CRT and the recording medium, FIG. 5 schematically shows a diagrammatical view of an embodiment of optical fiber CRTs according to this invention, FIG. 6 graphically shows the variation of light beam diameter to distance in the embodiment in FIG. 5, FIGS. 7(*a*) and 7(*b*) show a side view and a partial enlarged sectional view of the embodiment having a system shown in FIG. 5, and FIG. 8 schematically shows a diagrammatical view of an embodiment of a copy machine using the optical fiber CRT shown in FIGS. 7(*a*) and 7(*b*).

Referring to FIG. 5, in which a construction of an embodiment of this invention is schematically shown similarly as FIG. 3, the embodiment is characterized by the provision of a light transparent thin layer 14 between the optical fiber face plate 62 and the phosphor layer 8, and is similar as the conventional optical fiber CRT in the other constructional features.

The light developed by bombardment of electron beam 7 from electron gun 61 to phosphor 8 passes through the light transparent layer 14 and fibers 9 of the face plate, and is emitted from the face plate 62. The spreading of the emitted light beam 10' is reduced in comparison with the conventional optical fiber CRT wherein the transparent layer 14 is not provided, with the phosphor 8 directly deposited onto the inner surface of the optical fiber face plate 62. The light beam 10 in the conventional optical fiber CRT is shown by dotted lines in FIG. 5. In this embodiment, the apparent depth of focus is considerably increased.

Figure 6:
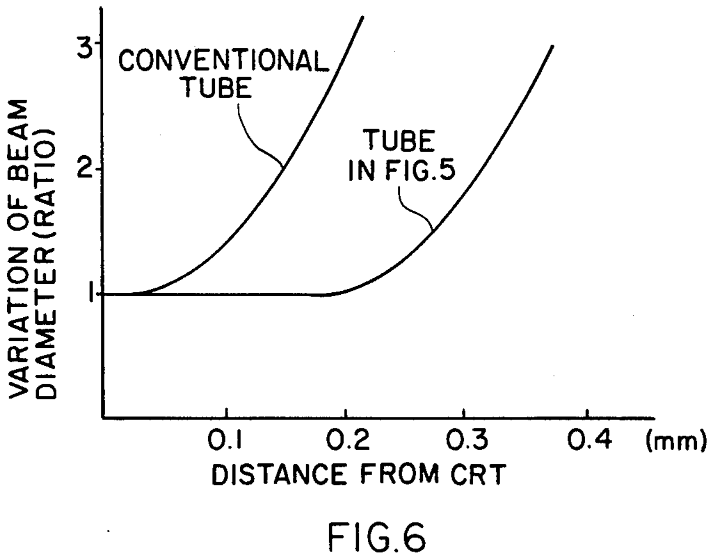

FIG. 6 graphically shows the variation of beam diameter to the distance or gap between the face plate 62 and a recording medium 11 in FIG. 5. The measurement was carried out by the two-slit method using a photomultiplier tube to measure the variation of half-amplitude width of the light beam. For the comparison, the beam diameter variation to distance of the conventional optical fiber CRT is shown in FIG. 6.

It will be noted from FIG. 6 that the improved CRT of this invention provides images at a greater distance from the CRT with a high resolution and a high brightness.

The thickness of the transparent thin layer 14 depends on the refractive index of the material of the layer 14. It may be generally selected to be from 0.03–1mm, and it may be preferably 0.1–1.0mm in the case of using glass, ceramics or heat-resistant organic resins.

The light transparent thin layer may be of a plate of glass, ceramics or heat-resistant organic resins such as polyamide and polyimide, or may be a laminated plate of several of them. Moreover the layer may include at least one spatial gap.

Figure 7A:
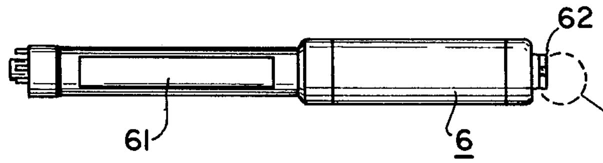
Figure 7B:
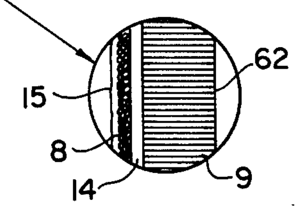

FIG. 7(*a*) shows as external view of the embodiment and FIG. 7(*b*) shows an enlarged sectional view of the portion encircled by a dotted line in FIG. 7(*a*). This embodiment is similar in external appearance to the conventional optical fiber CRT, but a light transparent thin layer 14 is provided on the inner surface of the optical fiber face plate and the phosphor 8 is deposited onto the layer 14. A conductive layer 15 such as an aluminum evaporated layer is provided on the phosphor layer 8 as usually provided in a conventional CRT.

According to the improved optical fiber CRT, the photosensitive medium can be disposed out of contact with the CRT to record images thereon without deterioration of image resolution. Therefore, the improved optical fiber CRT can be used in copy machines using Se coated drums or CdS coated drums. Furthermore, a freedom is afforded to a relative arrangement between the CRT and the photosensitive medium.

Figure 8:
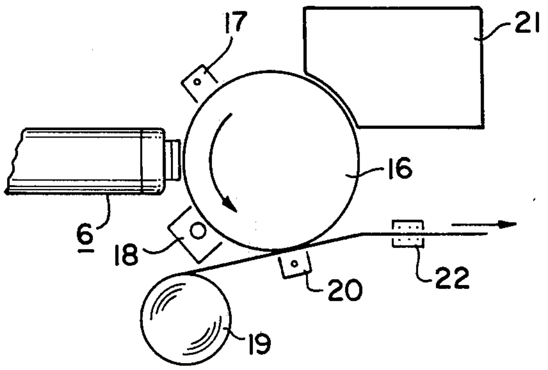

FIG. 8 schematically shows a copy machine using the improved optical fiber CRT in FIGS. 7(*a*) and 7(*b*). Referring to FIG. 8, a charger 17, the optical fiber CRT 6, a developer 18, a charger for toner transfer 20 and cleaner 21 are disposed around a Se coated or a CdS coated drum 16 in this order with angular spaces with one another in the rotational direction of the drum 16, with a paper 19 being fed between the drum 16 and the charger 20 at which the toner is transferred onto the paper 19, similarly as in a conventional copy machine. The toner transferred paper 19 then passes through a fixer 22 to be fixed by pressing or heating.

In this copy machine, the Se or CdS coated drum is not in contact with the CRT and, therefore, is not injured, because the optical fiber CRT in FIG. 7 provides an image at a distance from the CRT with a high resolution and a high brightness. In this copy machine, an image resolution of six lines per one millimeter (6 lines/1mm) was realized in the case of providing a gap of 500 μm between the improved optical fiber CRT 6 and the drum 16. But, in using a conventional optical fiber CRT with a gap of 100 μm from the drum 16, an image resolution of four lines per one millimeter (4 lines/1mm) was only obtained.

As above described, the conventional optical fiber CRT must be disposed in close contact with, for example, with a gap of 0.1mm or less, a recording medium. But, according to this invention, the recording medium can be disposed with an increased gap from the light emitting surface of the CRT enough to prevent the medium from being injured by the friction or the engagement therebetween, without deterioration of the image resolution.

What is claimed is:

1. In an optical fiber cathode ray tube having an optical fiber stack face plate for forming an image at a position spaced from the outer surface of the face plate comprising a large number of parallel non-lens-like glass fibers of small diameter, each fiber of which is sheathed with a glass having a lower refractive index than that of the fiber glass, the fiber ends forming the inner and outer surfaces of the face plate and phosphor being deposited on the inner surface of the face plate, the improvement comprising a light transparent thin layer provided between said phosphor layer and said inner surface of said optical fiber stack face plate, whereby a substantially constant high image resolution is maintained within a distance less than about 0.2mm from the outer surface of the face plate.

2. The improvement as claimed in claim 1, wherein said light transparent layer is 0.03–1mm in thickness.

3. The improvement as claimed in claim 2, wherein said light transparent layer is a light transparent plate of one selected from glass, ceramic and heat-resistant organic resin.

4. The improvement as claimed in claim 3, wherein said organic resin is one of polyamide and polyimide.

5. The improvement as claimed in claim 2, wherein said light transparent layer is a laminated light transparent plate of at least two layers, each selected from glass, ceramic and heat-resistant organic resin.

6. The improvement as claimed in claim 5, wherein said organic resin is one of polyamide and polyimide.

7. The improvement as claimed in claim 2, wherein said light transparent layer comprises at least one light transparent plate and at least one gap.

8. The improvement as claimed in claim 7, wherein said light transparent plate is of one selected from glass, ceramic and heat-resistant organic resin.

9. The improvement as claimed in claim 8, wherein said organic resin is one of polyamide and polyimide.

10. The improvement as claimed in claim 7, wherein said light transparent plate is a laminated plate of at least two layers each selected from glass, ceramic and heat-resistant organic resin.

11. The improvement as claimed in claim 10, wherein said organic resin is one of polyamide and polyimide.

12. In a copy machine comprising a cathode ray tube and a photosensitive medium which is movably disposed facing a face plate of the cathode ray tube, said cathode ray tube having an optical fiber stack face plate comprising a large number of parallel non-lens-like glass fibers of small diameter, each fiber of which is sheathed with a glass having a lower refractive index than that of the fiber glass, the fiber ends forming the inner and outer surfaces of the face plate and phosphor being deposited on the inner surfaces of the face plate, the improvement wherein said cathode ray tube comprises a light transparent thin layer disposed between said phosphor layer and said inner surface of said optical fiber stack face plate, and said cathode ray tube and said photosensitive medium being disposed with a gap of about 500 μm or less between the face plate of said cathode ray tube and the photosensitive surface of said photosensitive medium so that said photosensitive surface is out of physical engagement with said face plate.

13. The copy machine as claimed in claim 12, wherein said gap between said face plate and the photosensitive surface is about 500 μm.

* * * * *